(12) United States Patent
Takezaki et al.

(10) Patent No.: US 11,091,069 B2
(45) Date of Patent: Aug. 17, 2021

(54) SEATBACK ROTATING DEVICE

(71) Applicant: TOYOTA BOSHOKU KABUSHIKI KAISHA, Aichi (JP)

(72) Inventors: Masahiro Takezaki, Aichi (JP); Masatoshi Mori, Aichi (JP); Kenji Hashimoto, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 0 days.

(21) Appl. No.: 16/782,524

(22) Filed: Feb. 5, 2020

(65) Prior Publication Data
US 2020/0247283 A1 Aug. 6, 2020

(30) Foreign Application Priority Data
Feb. 6, 2019 (JP) .............................. JP2019-019730

(51) Int. Cl.
*B60N 2/22* (2006.01)
*B60N 2/02* (2006.01)

(52) U.S. Cl.
CPC ......... *B60N 2/2245* (2013.01); *B60N 2/0232* (2013.01); *B60N 2/0248* (2013.01); *B60N 2/2213* (2013.01); *B60N 2002/0236* (2013.01)

(58) Field of Classification Search
CPC .. B60N 2/0232; B60N 2/0248; B60N 2/2213; B60N 2/2245; B60N 2/366; B60N 2002/0236
See application file for complete search history.

(56) References Cited

U.S. PATENT DOCUMENTS

| 5,269,588 | A  | * | 12/1993 | Kunz     | B60N 2/12 297/322 |
| 5,435,624 | A  | * | 7/1995  | Bray     | B60N 2/0232 297/362 |
| 6,270,141 | B2 | * | 8/2001  | Moon     | B60N 2/206 296/65.08 |
| 7,134,724 | B2 | * | 11/2006 | Chabanne | B60N 2/2352 297/366 |
| 7,500,719 | B2 | * | 3/2009  | Kojima   | B60N 2/0232 297/362 |
| 8,047,595 | B2 | * | 11/2011 | Bach     | B60N 2/3011 296/65.08 |
| 8,109,555 | B2 | * | 2/2012  | DeVoss   | B60N 2/0232 296/65.08 |

(Continued)

FOREIGN PATENT DOCUMENTS

JP      2012-188084     10/2012

OTHER PUBLICATIONS

Machine translation of JP 2012188084A (Year: 2021).*

*Primary Examiner* — James M Ference
(74) *Attorney, Agent, or Firm* — Greenblum & Bernstein, P.L.C.

(57) ABSTRACT

Provided is a seatback rotating device. The seatback rotating device includes an electric motor and an application mechanism. The electric motor generates a rotational force that is used to rotationally displace a seatback of a vehicle seat. The application mechanism enables application of the rotational force to the seatback. The application mechanism has a configuration that enables the seatback to be self-rotatable with gravity applied to the seatback in response to the rotational force being applied to the seatback.

5 Claims, 21 Drawing Sheets

(56) References Cited

U.S. PATENT DOCUMENTS

| | | | | |
|---|---|---|---|---|
| 8,985,691 B2* | 3/2015 | Tsuruta | ............... | B60N 2/2356 297/378.12 |
| 9,902,296 B2* | 2/2018 | Keyser | ............... | B60N 2/20 |
| 10,195,962 B2* | 2/2019 | Bruck | ............... | B60N 2/20 |
| 2002/0089223 A1* | 7/2002 | Yu | ............... | B60N 2/2213 297/362.11 |
| 2004/0195892 A1* | 10/2004 | Daniels | ............... | B60N 2/0244 297/378.1 |
| 2006/0061183 A1* | 3/2006 | White | ............... | B60N 2/986 297/378.12 |
| 2006/0131946 A1* | 6/2006 | Andrigo | ............... | B60N 2/2213 297/378.1 |
| 2006/0273645 A1* | 12/2006 | Ferrari | ............... | B60N 2/3011 297/336 |
| 2007/0063567 A1* | 3/2007 | Nakaya | ............... | B60N 2/0232 297/362.11 |
| 2007/0126272 A1* | 6/2007 | Deptolla | ............... | B60N 2/0232 297/362.11 |
| 2009/0322137 A1* | 12/2009 | Kojima | ............... | B60N 2/2213 297/362 |
| 2010/0026073 A1* | 2/2010 | Bruck | ............... | B60N 2/20 297/378.1 |
| 2010/0225151 A1* | 9/2010 | Michalak | ............... | B60N 2/0232 297/344.1 |
| 2011/0084531 A1* | 4/2011 | Hida | ............... | B60N 2/0232 297/362 |
| 2013/0193735 A1* | 8/2013 | Bonk | ............... | B60N 2/20 297/378.12 |
| 2013/0200668 A1* | 8/2013 | Michalak | ............... | B60N 2/12 297/217.1 |
| 2014/0062157 A1* | 3/2014 | Bruck | ............... | B60N 2/0232 297/362.11 |
| 2014/0075719 A1* | 3/2014 | Navatte | ............... | B60N 2/0232 16/239 |
| 2015/0069806 A1* | 3/2015 | Lutzka | ............... | B60N 2/3065 297/340 |
| 2015/0321586 A1* | 11/2015 | Szybisty | ............... | B60N 2/309 297/316 |
| 2018/0015850 A1* | 1/2018 | Bruck | ............... | B60N 2/0232 |
| 2020/0247281 A1* | 8/2020 | Takezaki | ............... | B60N 2/366 |
| 2020/0247283 A1* | 8/2020 | Takezaki | ............... | B60N 2/366 |

\* cited by examiner

SEATBACK ROTATING DEVICE

CROSS-REFERENCE TO RELATED APPLICATIONS

This application claims the benefit of Japanese Patent Application No. 2019-19730 filed on Feb. 6, 2019 with the Japan Patent Office, the entire disclosure of which is incorporated herein by reference.

BACKGROUND

The present disclosure relates to a seatback rotating device that is used to rotate a seatback of a vehicle seat to be mounted in a vehicle.

For example, a seatback rotating device disclosed in Japanese Unexamined Patent Application Publication No. 2012-188084 (Patent Document 1) comprises a spring (spiral spring) for tilting a seatback seat-frontward. In this seatback rotating device, a sector gear is rotated to a return-standby position, to thereby inhibit the seatback from tilting at a high speed.

SUMMARY

In the present disclosure, it is desirable to provide one example of a seatback rotating device that can inhibit a seatback from tilting at an excessively high speed and, at the same time, can eliminate need of a spring used for tilting or rotationally displacing the seatback.

It is desirable that the seatback rotating device of the present disclosure comprises, for example, at least one of the following constituent elements.

Specifically, the constituent elements are an electric motor and an application mechanism. The electric motor generates a rotational force that is used to rotationally displace a seatback of a vehicle seat. The application mechanism enables application of the rotational force to the seatback. The application mechanism has a configuration that enables the seatback to be self-rotatable with gravity applied to the seatback in response to application of the rotational force.

The seatback of the vehicle seat starts rotating in response to rotation via the application mechanism. In response to this, the seatback can be placed in a self-rotatable state with the gravity applied to the seatback.

During self-rotation, a rotational speed of the seatback is small relative to a rotational speed according to a configuration in which the seatback is rotated by a spring. Therefore, the seatback rotating device has a configuration that can inhibit the seatback from tilting at an excessively high speed and, at the same time, can eliminate need of a spring that is used to tilt or rotationally displace the seatback.

Here, it is desirable that the seatback rotating device includes the following configurations.

It is desirable that the application mechanism includes a rotor and an abutment target portion. The rotor rotates in response to the rotational force. The rotor includes a first protrusion and a second protrusion that protrude in a radial direction of the rotor. The abutment target portion is integrally and rotationally displaced with the seatback. The abutment target portion enables one of the first protrusion or the second protrusion to contact the abutment target portion. The abutment target portion experiences the rotational force in response to contact with one of the first protrusion or the second protrusion. The second protrusion is disposed in a position that is displaced with respect to the first protrusion in the rotational direction of the rotor. The position of the second protrusion places the second protrusion in a non-contact state with the abutment target portion in a state where the first protrusion and the abutment target portion contact each other. And, the abutment target portion is always present between the first protrusion and the second protrusion without being affected by a position of the seatback.

According to the above configuration, in the seatback rotating device, the seatback starts rotating due to the rotational force in response to one of the first protrusion or the second protrusion contacting the abutment target portion.

The second protrusion is placed in the position that is displaced with respect to the first protrusion in the rotational direction of the rotor and the second protrusion is always present between the first protrusion and the second protrusion without being affected by the position of the seatback.

As a result, the seatback is freely and rotationally displaceable in a section defined between the first protrusion and the second protrusion. Accordingly, a user of the vehicle seat, to which the seatback rotating device is applied, can rotationally displace the seatback by manual operation. In other words, the seatback rotating device can inhibit a rotational speed of the seatback from being excessively large and, at the same time, enables the seatback to be rotationally displaced with manual operation.

It is desirable that the seatback rotating device further comprises a controller that controls operation of the electric motor and the controller can execute a control mode. In the control mode, the electric motor is rotated in a forward direction, to thereby bring the first protrusion and the abutment target portion into contact with each other to apply the rotational force to the seatback. Thereafter, the seatback reaches a specified first position. In response to the seatback reaching the specified first position, the electric motor is rotated in a reverse direction to bring the first protrusion back to a specified second position. This configuration enables the user to rotationally displace the seatback between the first position and the second position by manual operation.

The second position can be a position to place the seatback in a seatable state. In this case, the user can place the seatback, which is tilted, in the seatable state by manual operation.

It is desirable that the second protrusion is situated in a position within a specified area defined with respect to the abutment target portion when the seatback is placed in a tilted state and the first protrusion is placed in the second position. This configuration allows the seatback to start being immediately and rotationally displaced to be in the seatable state in conjunction with start of rotation of the electric motor.

It is desirable that the seatback rotating device further comprises a sensor that outputs a signal to the controller in response to the seatback reaching a tilt position. The signal indicates that the seatback reaches the tilt position. And, it is desirable that, during execution of the control mode, the controller rotates the electric motor in the forward direction until receiving the signal. This configuration ensures that the seatback is placed in the tilt position.

BRIEF DESCRIPTION OF THE DRAWINGS

Embodiments of the present disclosure will be described hereinafter by way of example with reference to the accompanying drawings, in which.

DETAILED DESCRIPTION OF EXEMPLARY EMBODIMENTS

Figure 1:
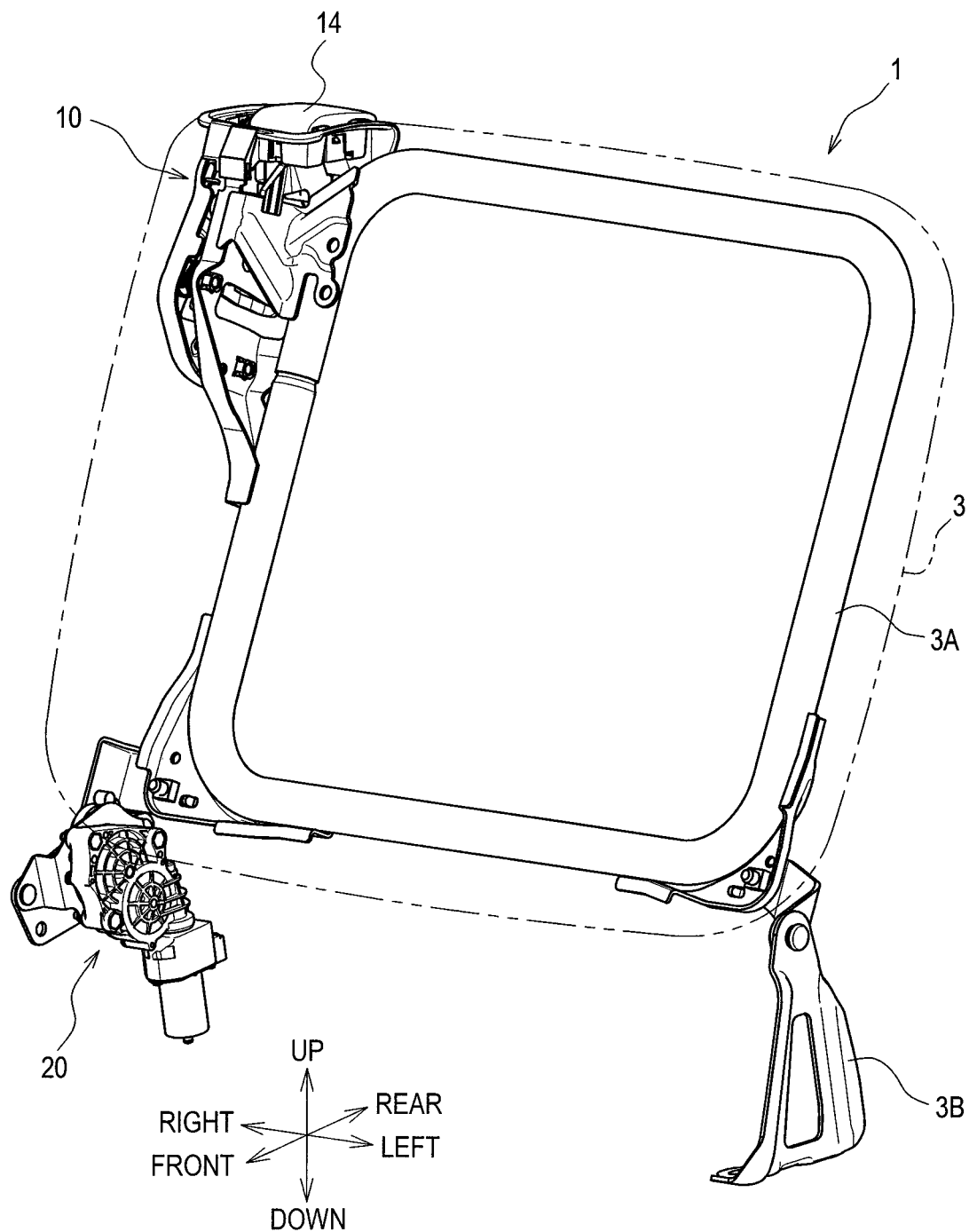
FIG. 1 is a view showing a vehicle seat of a first embodiment.

An "embodiment" to be described below is one example of embodiments that fall within the technical scope of the present disclosure. In other words, matters specifying the invention recited in claims are not limited to specific configurations, structures, and the like that are shown in the embodiments below.

At least in respect of a member or portion that is labeled with a reference numeral for explanations, there is at least one in number of such a member or portion unless the number is otherwise specified, for example, as "one of". In other words, there may be two or more of such a member or portion when the number is not specified.

In the present embodiment, descriptions are given to an example of a seat to be mounted in a vehicle such as an automobile (hereinafter, referred to as a vehicle seat). Arrows and other marks that indicate the directions labelled on each drawing are made for easy understanding of relationships between the drawings.

Therefore, the invention shown in the present disclosure is not limited to the directions labelled on each drawing. The directions shown in the drawings are based on a state where the vehicle seat of the present embodiment is assembled to the vehicle.

First Embodiment

1. Overview of Vehicle Seat and the Like

As shown in FIG. 1, a vehicle seat 1 comprises at least a seatback 3, a lock device 10, and a seatback rotating device 20. The seatback 3 is a portion for supporting the back of an occupant.

The seatback 3 is a seatback of a vehicle seat that is used for a rear seat of a vehicle. The seatback 3 is rotatable in seat front-rear directions (in the present embodiment, vehicle front-rear directions and hereinafter simply referred to as front-rear directions).

A back frame 3A is a metal member that forms a framework of the seatback 3. The back frame 3A is rotatably coupled to a vehicle body via the seatback rotating device 20 and a bracket 3B.

Figure 2:
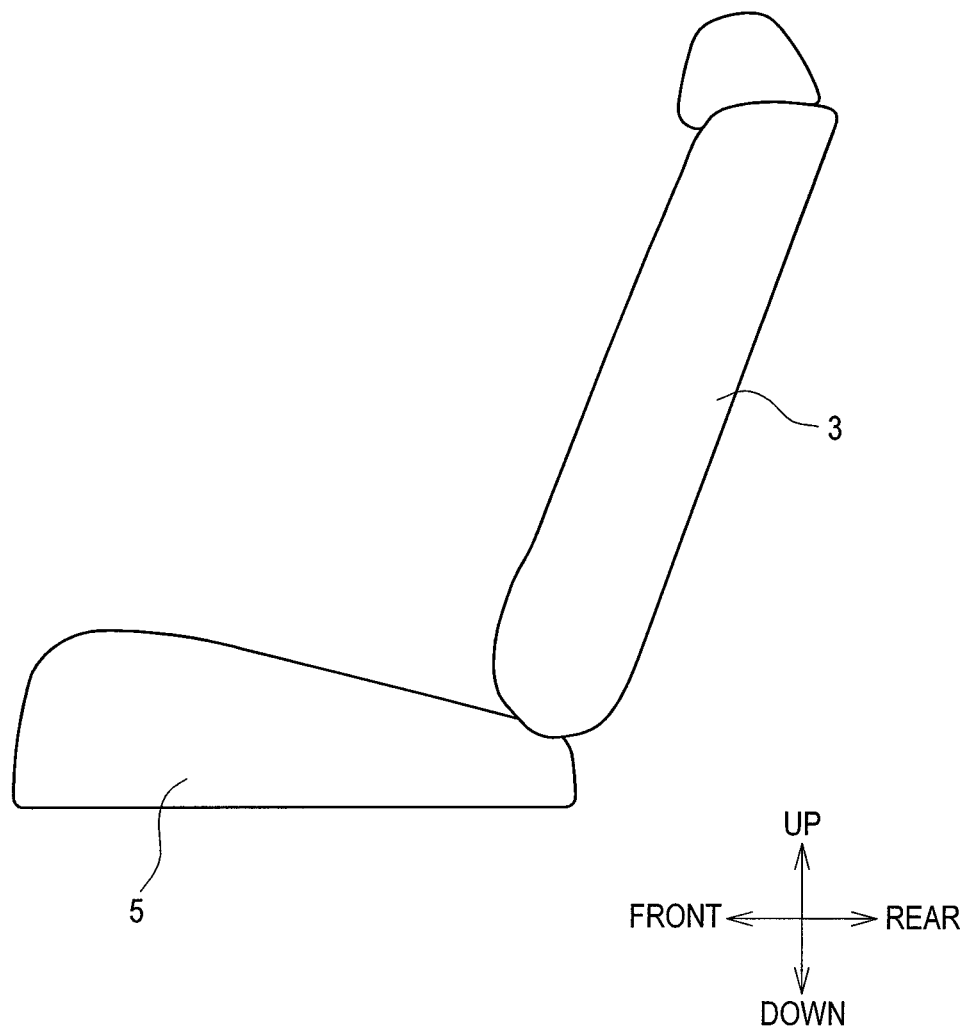
FIG. 2 is a view showing the vehicle seat of the first embodiment.
Figure 3:
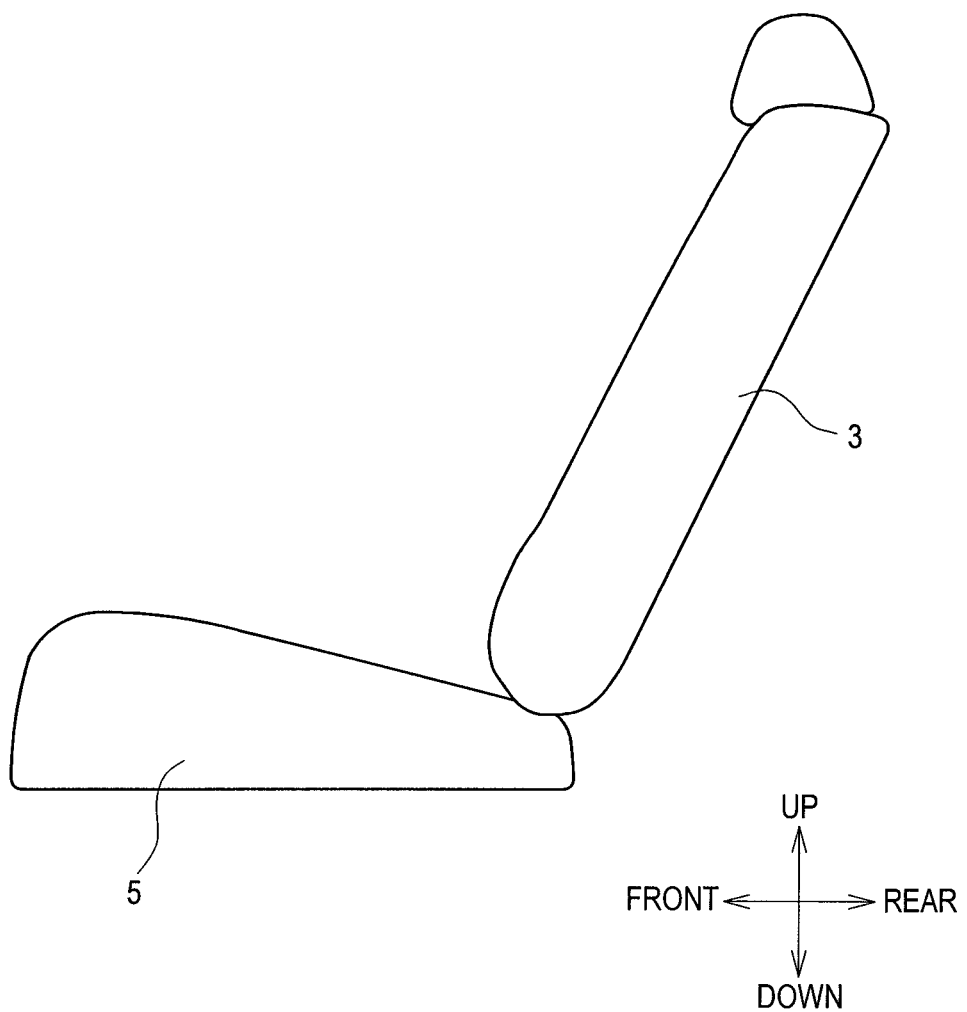
FIG. 3 is a view showing the vehicle seat of the first embodiment.

The lock device 10 can execute a lock mode and a released mode. The lock mode holds the seatback 3 in a first standing position (see, FIG. 2) or a second standing position (see, FIG. 3). The released mode releases the lock mode. The second standing position is displaced seat-rearward (rearward) with respect to the first standing position.

Figure 4:
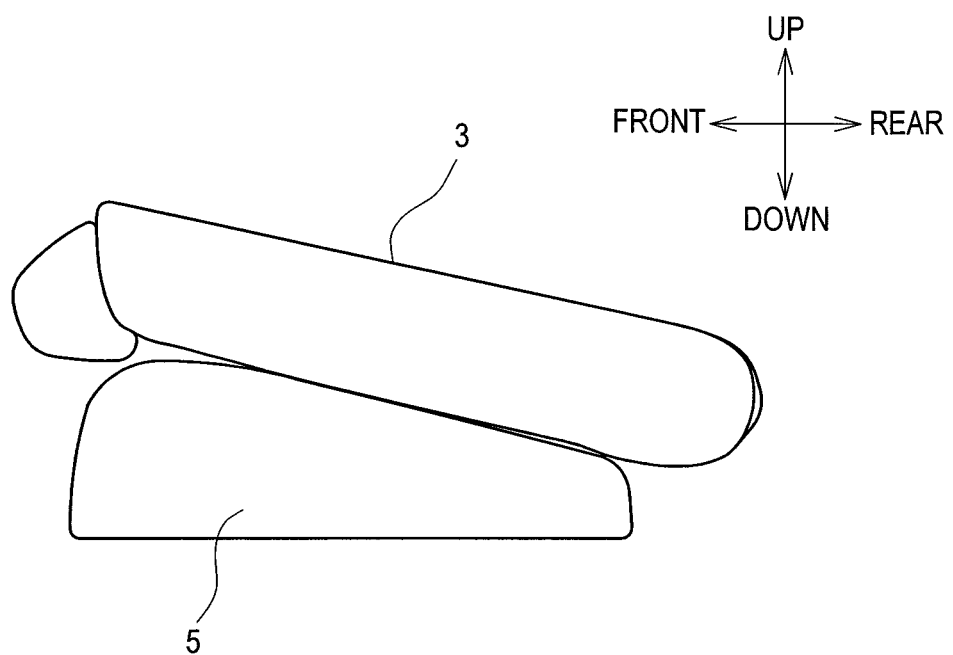
FIG. 4 is a view showing the vehicle seat of the first embodiment.

When the lock device 10 is placed in a released state, the seatback 3 can tilt to a position that allows the seatback 3 to contact or come in proximity to a seat cushion 5, as shown in FIG. 4 (hereinafter, referred to as a tilt position). The seat cushion 5 is a portion for supporting the buttocks of the occupant.

2. Structure of Lock Device

<Overview of Lock Device>

Figure 5:
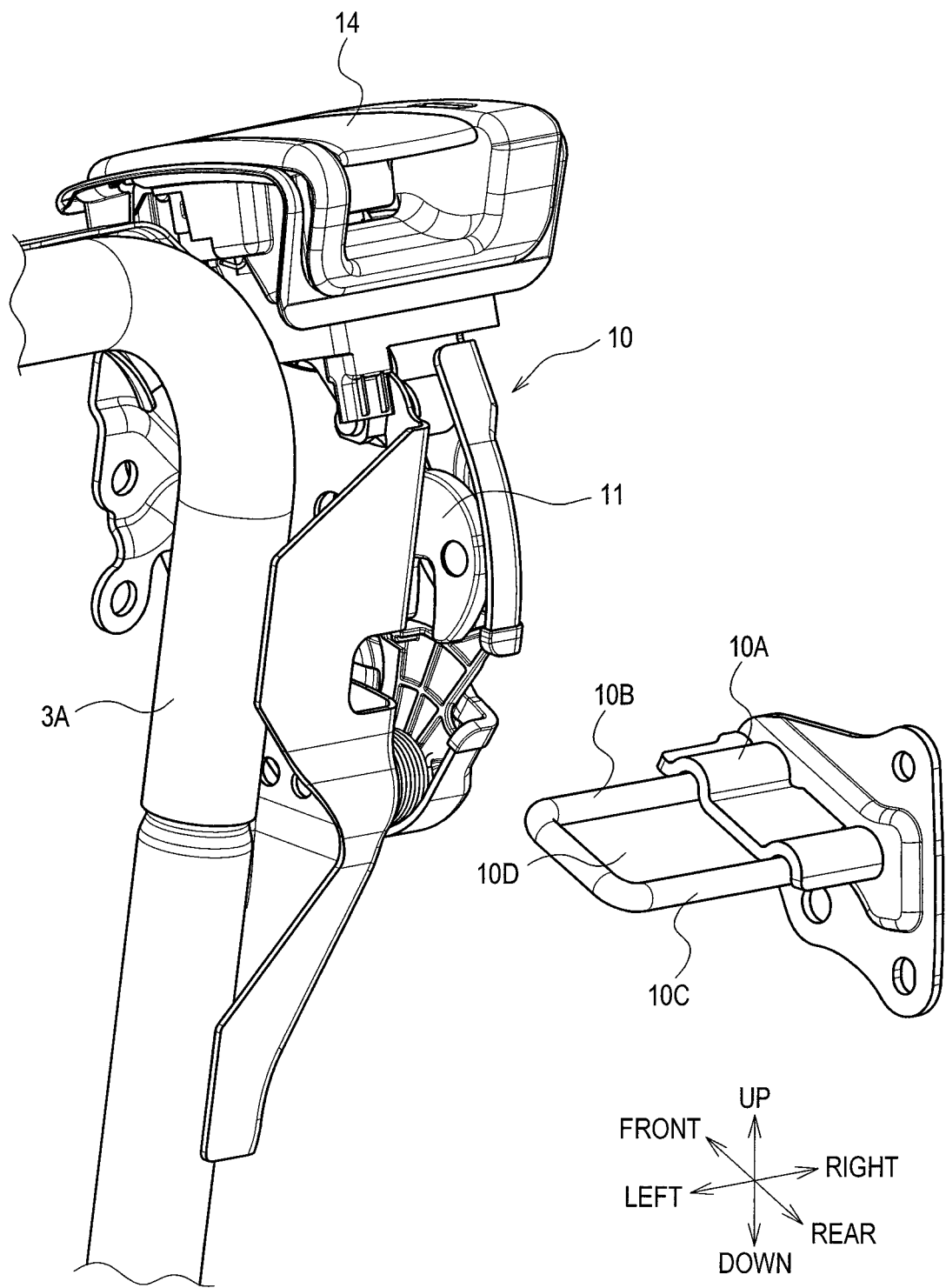
FIG. 5 is a view showing a lock device of the first embodiment.
Figure 6:
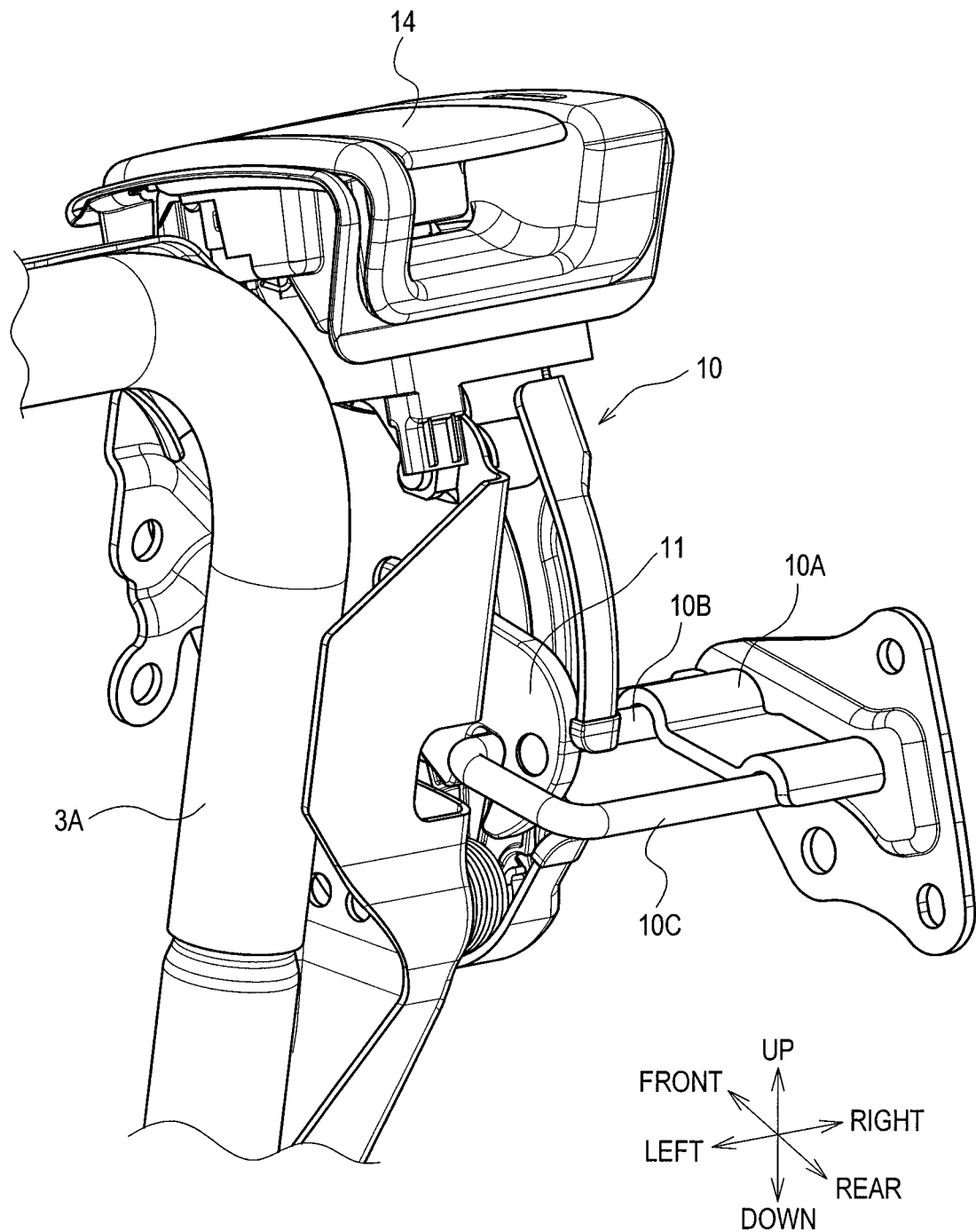
FIG. 6 is a view showing the lock device of the first embodiment.
Figure 7:
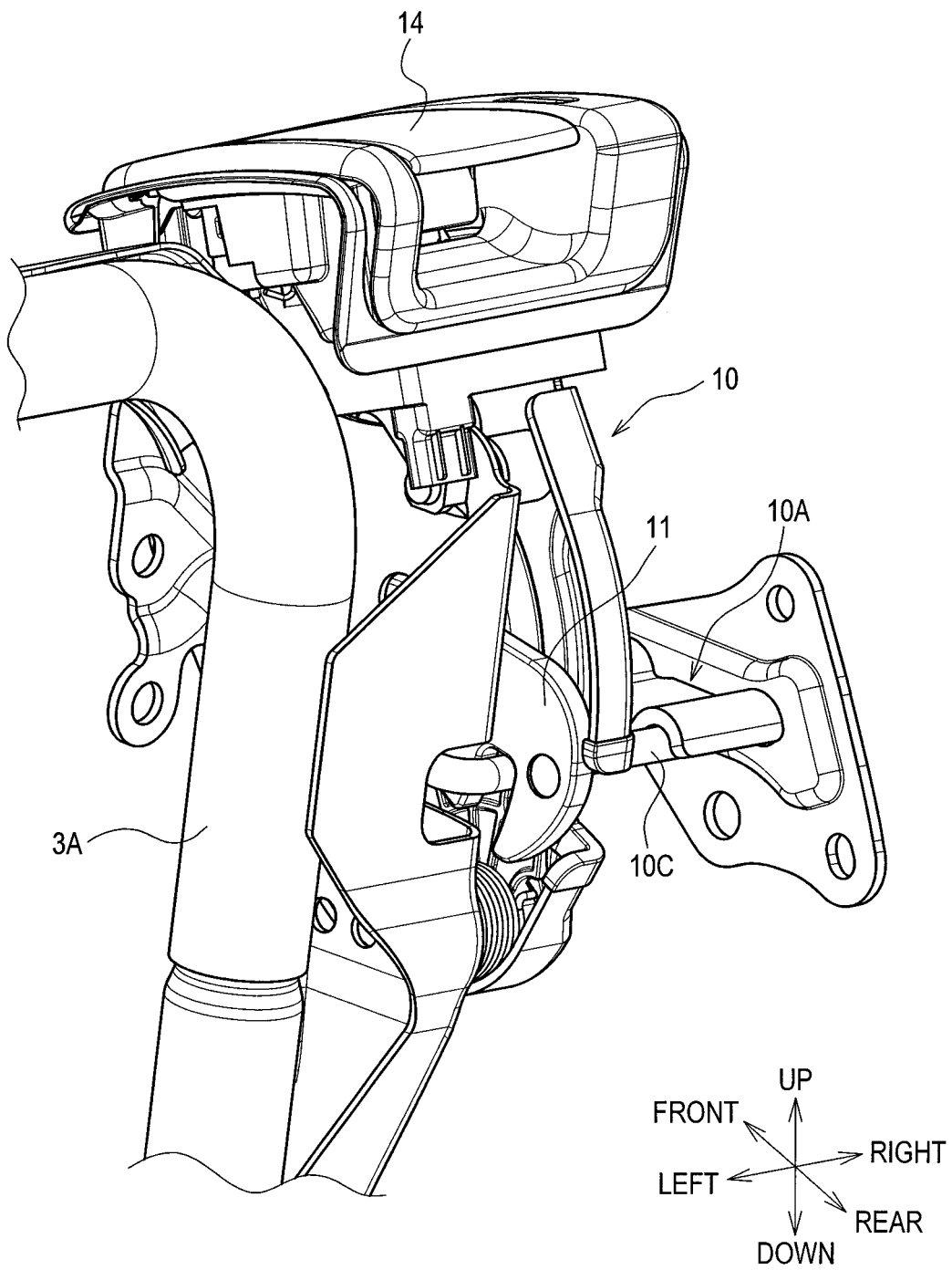
FIG. 7 is a view showing the lock device of the first embodiment.

As shown in FIG. 1, the lock device 10 is fixed to the back frame 3A at an upper right end of the back frame 3A (closer to a door inner panel (not shown)). UP-down and left-right directions are the directions shown in FIG. 1. The lock device 10 is engaged with a striker 10A shown in FIG. 5A, to thereby hold the back frame 3A in the first standing position (see, FIG. 6) or the second standing position (see, FIG. 7).

The striker 10A is one example of an engagement target member that is fixed to a vehicle body component such as the door inner panel or the like. The striker 10A includes at least a first engagement bar 10B and a second engagement bar 10C that extend toward the back frame 3A from the door inner panel.

The first engagement bar 10B and the second engagement bar 10C are spaced apart from each other across a space 10D in the front-rear directions. The first engagement bar 10B is positioned closer to a seat front than the second engagement bar 10C is. In the present embodiment, the first engagement bar 10B and the second engagement bar 10C are one-piece article that is formed by bending a single metal bar.

<Details of Lock Device>

Figure 8:
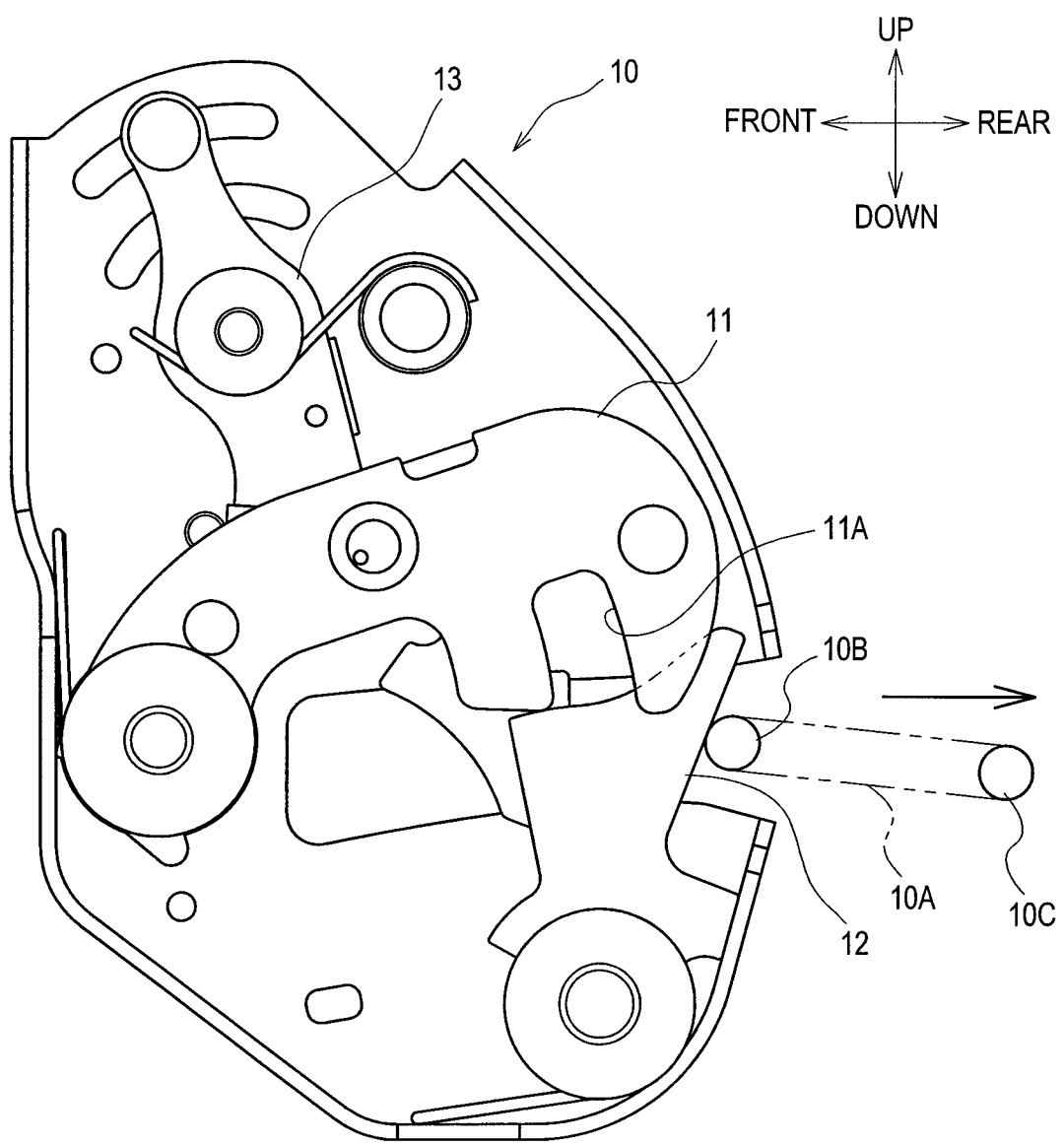
FIG. 8 is a view showing the lock device of the first embodiment.

As shown in FIG. 8, the lock device 10 comprises at least a hook 11, a standby plate 12, a pole 13, and an operator 14 (see, FIG. 1).

Figure 9:
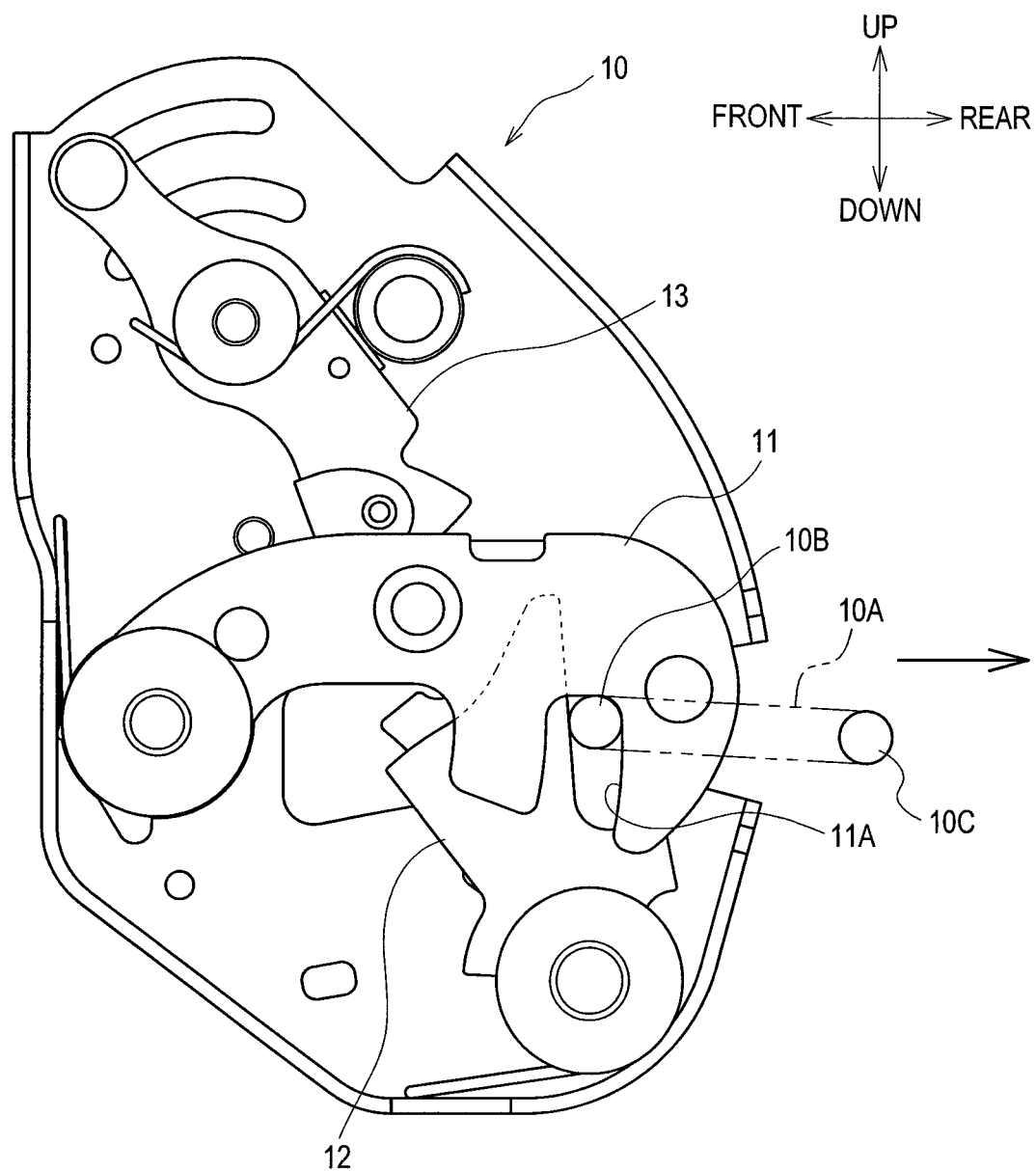
FIG. 9 is a view showing the lock device of the first embodiment.
Figure 11:
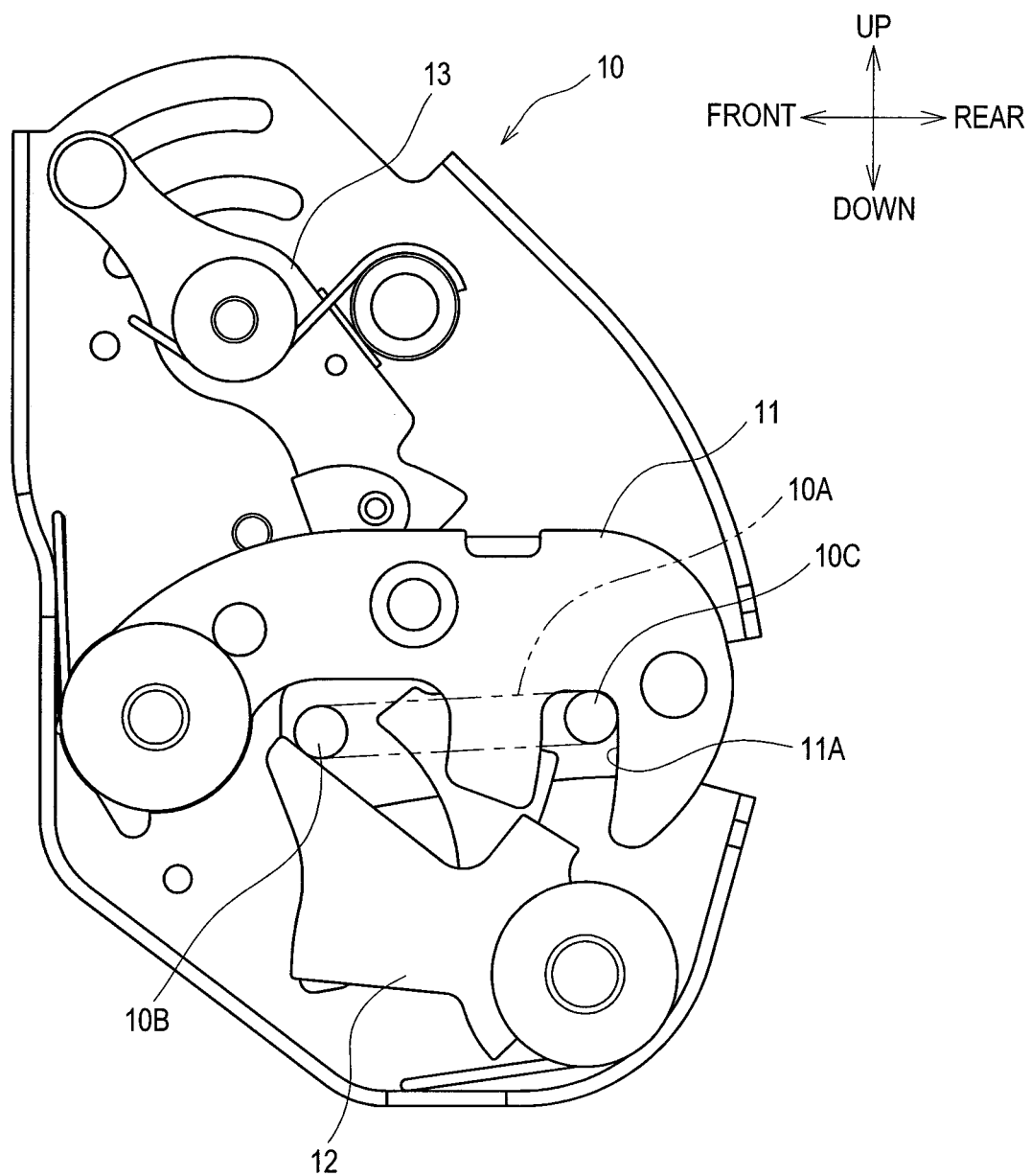
FIG. 11 is a view showing the lock device of the first embodiment.

As shown in FIGS. 9 and 11, the hook 11 is an engagement member that is engaged with the striker 10A (the first engagement bar 10B or the second engagement bar 10C) in a catching manner. Therefore, the hook 11 is provided with a recess 11A to allow the first engagement bar 10B or the second engagement bar 10C to fit therein.

The hook 11 is displaceable between an engaged position (see, FIGS. 9 and 11) and a released position (see, FIGS. 8 and 10). The engaged position allows the hook 11 to be engaged with the striker 10A. The released position allows the hook 11 to be released from the engagement. In other words, the lock device 10 is placed in a locked state when the hook 11 is placed in the engaged position. The lock device 10 is placed in the released state when the hook 11 is placed in the released position.

Specifically, the seatback 3 is held in the first standing position when the hook 11 is engaged with the first engagement bar 10B (see, FIG. 9). The seatback 3 is held in the second standing position when the hook 11 is engaged with the second engagement bar 10C (see, FIG. 11).

The hook 11 constantly experiences an elastic force from a hook spring (not shown). The elastic force is a force for displacing the hook 11 toward the engaged position. The operator 14 is a portion that is operated by a user when the hook 11 is displaced to the released position.

The pole 13 transmits an operation force, which is input in the operator 14, to the hook 11. In other words, the hook 11 is displaced from the engaged position to the released position in response to the operator 14 being operated. The hook 11 returns to the engaged position due to the elastic force of the hook spring in response to disappearance of the operation force.

Figure 14:
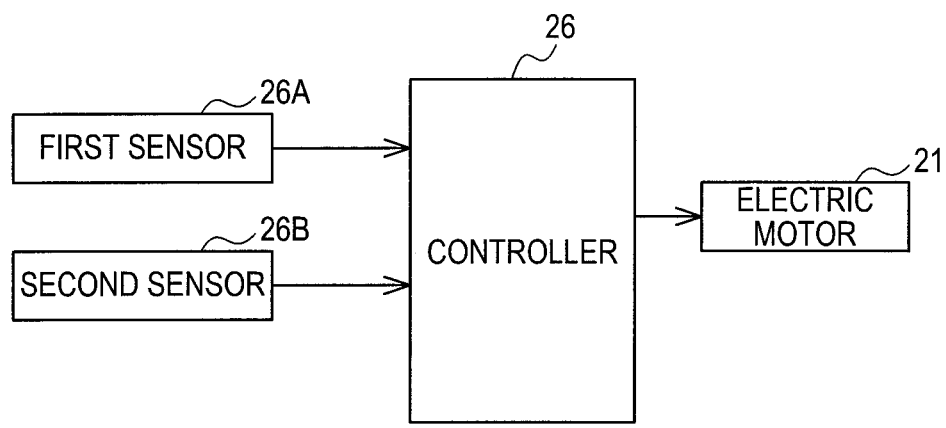
FIG. 14 is a block diagram of a control system of the seatback rotating device of the first embodiment.

The pole 13 also operates with an actuator (not shown) that is controlled by a controller 26 (see, FIG. 14). Specifically, the hook 11 is displaced between the engaged position and the released position in response to a control command of the controller 26.

The standby plate 12 is displaceable to (i) a first standby position (see, FIG. 8) and a second standby position (see, FIG. 10) to hold the hook 11 in the released position. The standby plate 12 is also displaceable to (ii) respective two positions that are displaced from the positions (i) (see, FIGS. 9 and 11). In other words, the standby place 12 is displaceable between the positions (i) and the positions (ii).

As shown in FIG. 8, the first standby position holds the hook 11 in a released state where the hook 11 is neither engaged with the first engagement bar 10B nor the second engagement bar 10C.

Figure 10:
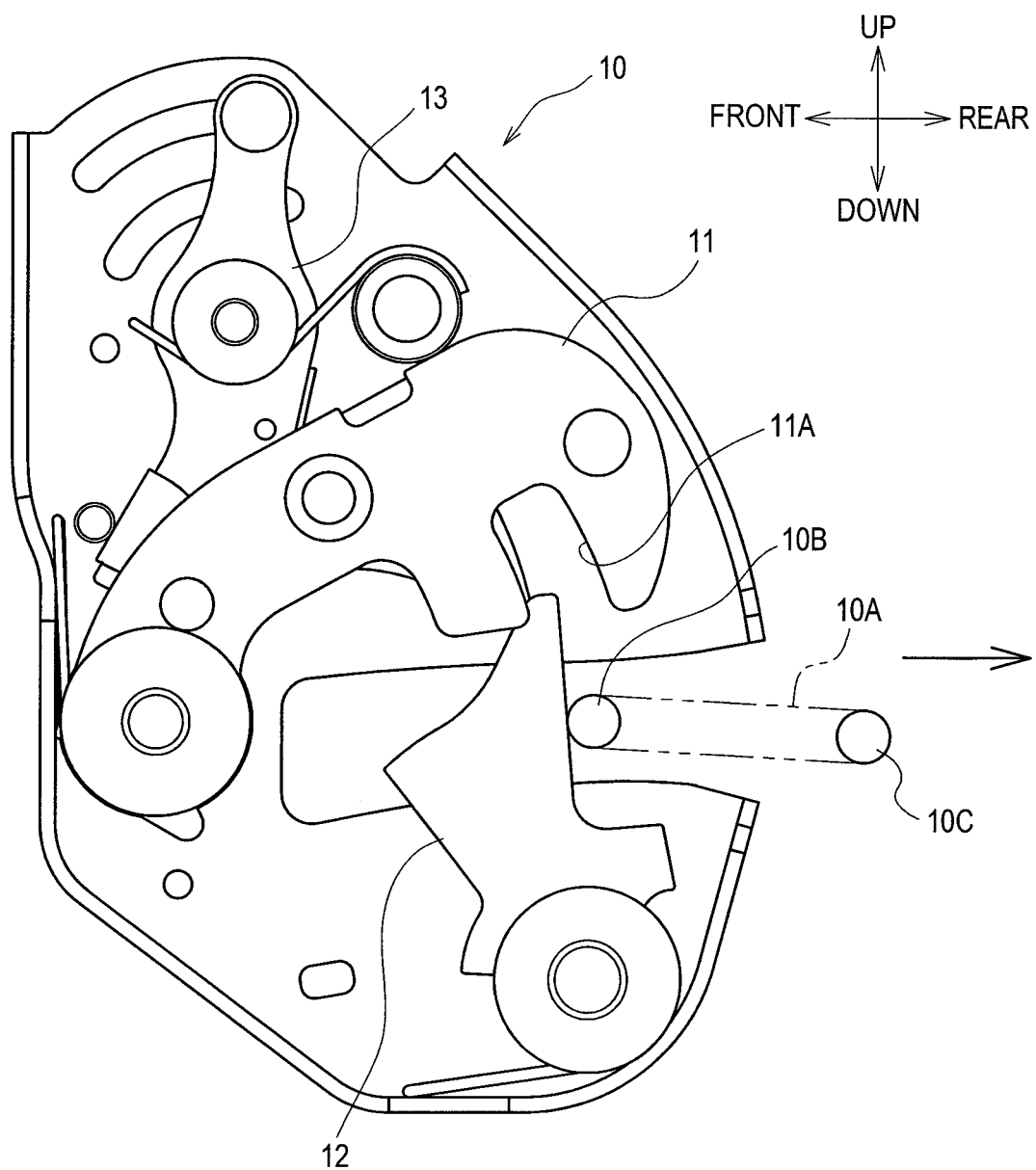
FIG. 10 is a view showing the lock device of the first embodiment.

As shown in FIG. 10, the second standby position releases the hook 11 from engagement with the first engagement bar 10B and holds the hook 11 in a position that allows the hook 11 to be engaged with the second engagement bar 10C.

3. Seatback Rotating Device

<Overview of Seatback Rotating Device>

Figure 12:
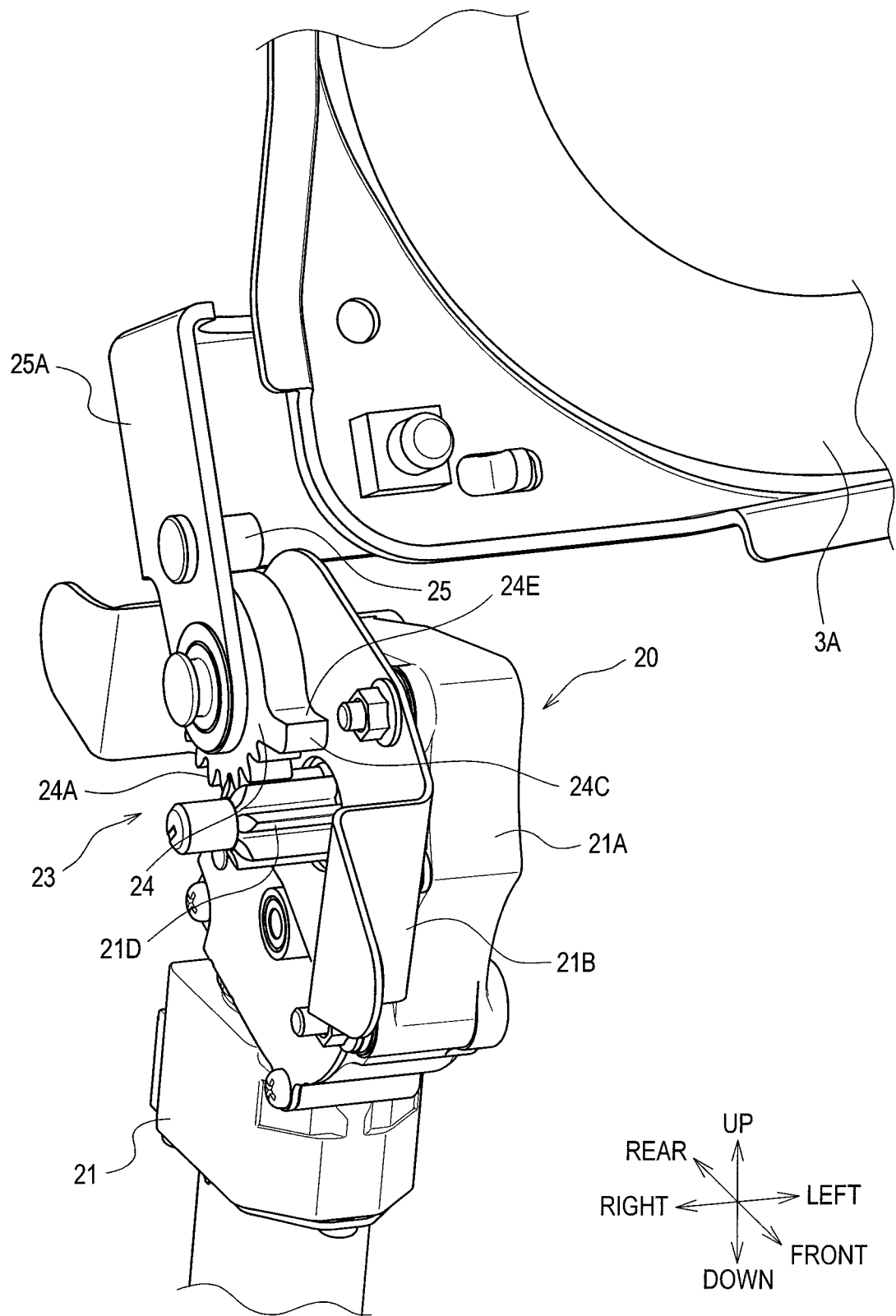
FIG. 12 is a view showing a seatback rotating device of the first embodiment.

The seatback rotating device 20 rotationally displaces the seatback 3 in the front-rear directions. As shown in FIG. 12, the seatback rotating device 20 comprises at least an electric motor 21, an application mechanism 23 and the controller 26 (see, FIG. 14).

Figure 13:
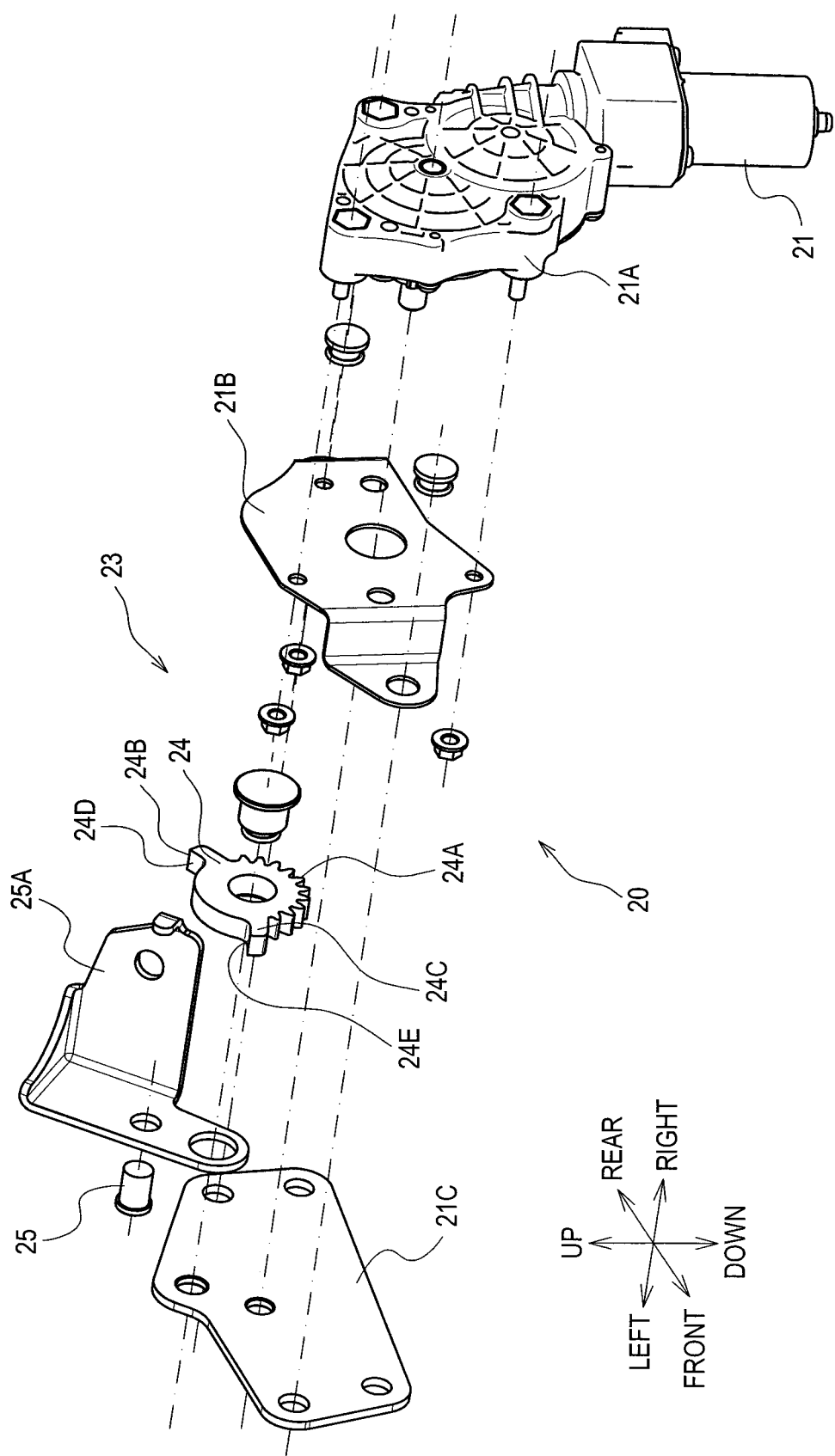
FIG. 13 is an exploded view of the seatback rotating device of the first embodiment.

The electric motor 21 generates a rotational force for rotationally displacing the seatback 3. The electric motor 21 can rotate in a forward direction and in a reverse direction. As shown in FIG. 13, the electric motor 21 of the present embodiment is integral with a deceleration mechanism 21A.

The deceleration mechanism 21A is a gear-type deceleration mechanism that includes at least a worm and a worm wheel. The electric motor 21 and the deceleration mechanism 21A are fixed to a motor bracket 21B. The motor bracket 21B is fixed to the vehicle body component via an attaching bracket 21C.

The application mechanism 23 allows the rotational force of the electric motor 21 to be applied to the seatback 3. Specifically, the application mechanism 23 is configured such that the seatback 3 is self-rotatable with gravity applied to the seatback 3 in response to the seatback 3 experiencing the rotational force that rotates the seatback 3 seat-frontward (frontward).

<Detailed Configuration of Application Mechanism>

As shown in FIG. 13, the application mechanism 23 includes at least a sector gear 24 and a press pin 25. The sector gear 24 is one example of a rotor that rotates in response to the rotation force.

The sector gear 24 includes at least a gear portion 24A, a first protrusion 24B, and a second protrusion 24C. The gear portion 24A meshes with an output gear 21D of the deceleration mechanism 21A (see, FIG. 12). This enables the sector gear 24 to rotate in response to operation of the electric motor 21. The sector gear 24 includes a first area 24F and a second area 24S. The first area 24F is situated between the first protrusion 24B and the second protrusion 24C and the first area 24F includes the first protrusion 24B and the second protrusion 24C. The second area 24S is situated opposite to the first area 24F. The gear portion 24A is formed in the second area 24S.

The first protrusion 24B and the second protrusion 24C are portions that protrude in a radial direction of the sector gear 24. The first protrusion 24B and the second protrusion 24C, respectively, configure a first abutment surface 24D and a second abutment surface 24E that can be brought into contact with the press pin 25. The sector gear 24 of the present embodiment is a one-piece article with which the first protrusion 24B and the second protrusion 24C are integrally molded.

The press pin 25 is integrally displaced with the seatback 3. The press pin 25 is one example of an abutment target that can be brought into contact with one of protrusions the first protrusion 24B or the second protrusion 24C, in other words, one of abutment surfaces the first abutment surface 24D or the second abutment surface 24E.

As shown in FIG. 12, the press pin 25 is fixed to a pin bracket 25A. The pin bracket 25A is fixed to the back frame 3A. Therefore, the press pin 25 is integrally and rotationally displaced with the seatback 3.

In a state where the first protrusion 24B and the press pin 25 abut against each other, the rotational force, which rotates the seatback 3 frontward, is ready to be input to the press pin 25. In a state where the second protrusion 24C and the press pin 25 abut against each other, a rotational force, which rotates the seatback 3 rearward, is ready to be input to the press pin 25.

As the seatback 3 rotates frontward with the electric motor 21, the electric motor 21 rotates in the forward direction. As the seatback 3 rotates rearward with the electric motor 21, the electric motor 21 rotates in the reverse direction. In response to rotation of the electric motor 21 in the forward direction, the sector gear 24 rotates in the forward direction. In response to rotation of the electric motor 21 in the reverse direction, the sector gear 24 rotates in the reverse direction.

<Controller>

As shown in FIG. 14, the operation of the electric motor 21 is controlled by the controller 26. The controller 26 is configured with a microcomputer that includes a CPU, a ROM, a RAM, and the like.

The controller 26 controls the operation of the electric motor 21 in accordance with a program that is stored in advance in a nonvolatile storage such as the ROM or the like. The controller 26 receives an output signal of a first sensor 26A.

The first sensor 26A outputs a signal that shows whether the seatback 3 rotates frontward to a specified first position of the present embodiment. The term "specified first position" is set between the tilt position (see, FIG. 4) and the first standing position.

Specifically, at the first position, the seatback 3 automatically starts rotating frontward due to the gravity applied to the seatback 3. In other words, the seatback 3 starts tilting due to its own weight when the seatback 3 reaches the first position.

Then, the first sensor 26A outputs a signal to the controller 26, the signal indicating that the seatback 3 reaches the first position. The first sensor 26A and the controller 26 detect whether the seatback 3 reaches the first position, taking advantage of a value of a conduction current, which flows to the electric motor 21, exceeding a threshold value.

In the present embodiment, a stopper (not shown) is provided to mechanically stop rotation of the sector gear 24, in other words, the rotation of the electric motor 21, in response to the electric motor 21 rotating in the forward direction and then the seatback 3 reaching the first position.

In response to stop of the rotation of the electric motor 21 in a conducted state, a value of the conduction current increases. As a result, the first sensor 26A and the controller 26 detect the increase in value of the conduction current, thus detecting that the seatback 3 reaches the first position.

The controller 26 also receives an output signal of the second sensor 26B. The second sensor 26B detects whether the seatback 3 is placed in the first standing position. The second sensor 26B may be configured with a limit switch or a proximity switch. The second sensor 26B outputs an ON signal when the seatback 3 is placed in the first standing position.

<Positional Relationship Between First, Second Protrusions and Press Pin>

As shown in FIGS. 15 to 20, the second protrusion 24C is situated at a position that is displaced with respect to the first protrusion 24B in the forward direction. Specifically, a length measured from the first abutment surface 24D to the second abutment surface 24E along a rotational direction of the sector gear 24 is greater than the diameter of the press pin 25.

Therefore, in a state where the first protrusion 24B and the press pin 25 contact each other (see, FIG. 17), the second protrusion 24C is placed in a non-contact state with the press pin 25. In a state where the second protrusion 24C and the press pin 25 contact each other (see, FIG. 20), the first protrusion 24B is placed in a non-contact state with the press pin 25.

The press pin 25 is always present between the first protrusion 24B and the second protrusion 24C without being affected by a position of the seatback 3 (see, FIGS. 15 to 20). In other words, the press pin 25 does not contact the gear portion 24A.

Figure 15:
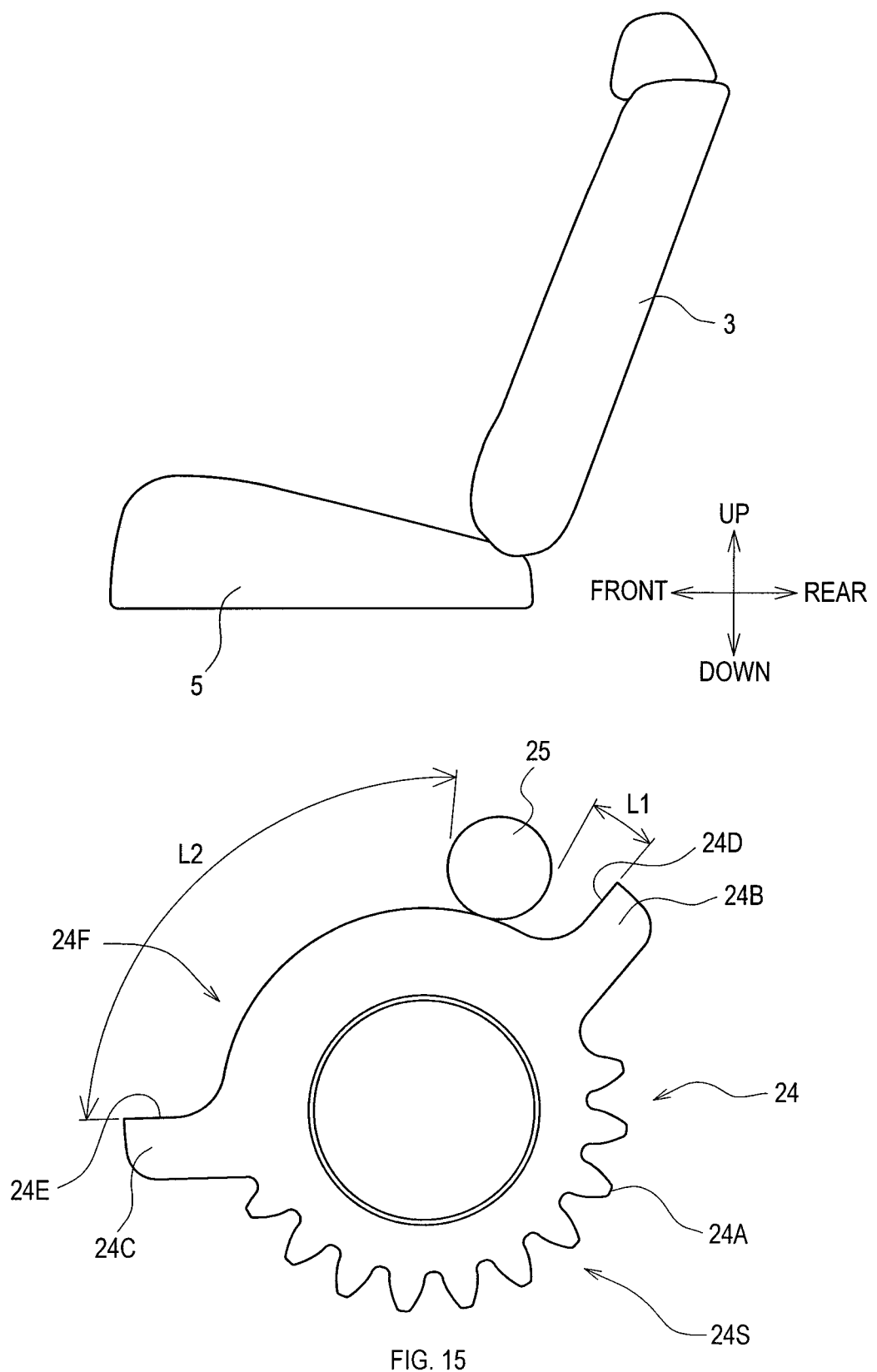
FIG. 15 is an explanatory diagram of operation of the seatback rotating device of the first embodiment.

When the seatback 3 is placed in the first standing position, for example, the controller 26 places the sector gear 24 in a position that creates a gap between the first protrusion 24B and the press pin 25 and a gap between the second protrusion 24C and the press pin 25 as shown in FIG. 15. Hereinafter, when the sector gear 24 is placed in the aforementioned position, the sector gear 24 will be referred to as being in a standby state.

When the sector gear 24 is placed in the standby state, a gap length L1 from the first protrusion 24B to the press pin 25 is small relative to a gap length L2 from the second protrusion 24C to the press pin 25. The gap lengths L1 and L2 are lengths of the respective gaps along a rotational direction of the sector gear 24 about the central axis of the sector gear 24.

Specifically, in the standby state, the gap length L1 along the rotational direction of the sector gear 24 allows the seatback 3 to be displaced to the second standing position with the sector gear 24 remaining in the standby state. The upper drawing of FIG. 16 shows that the seatback 3 is placed in the second standing position.

Figure 16:
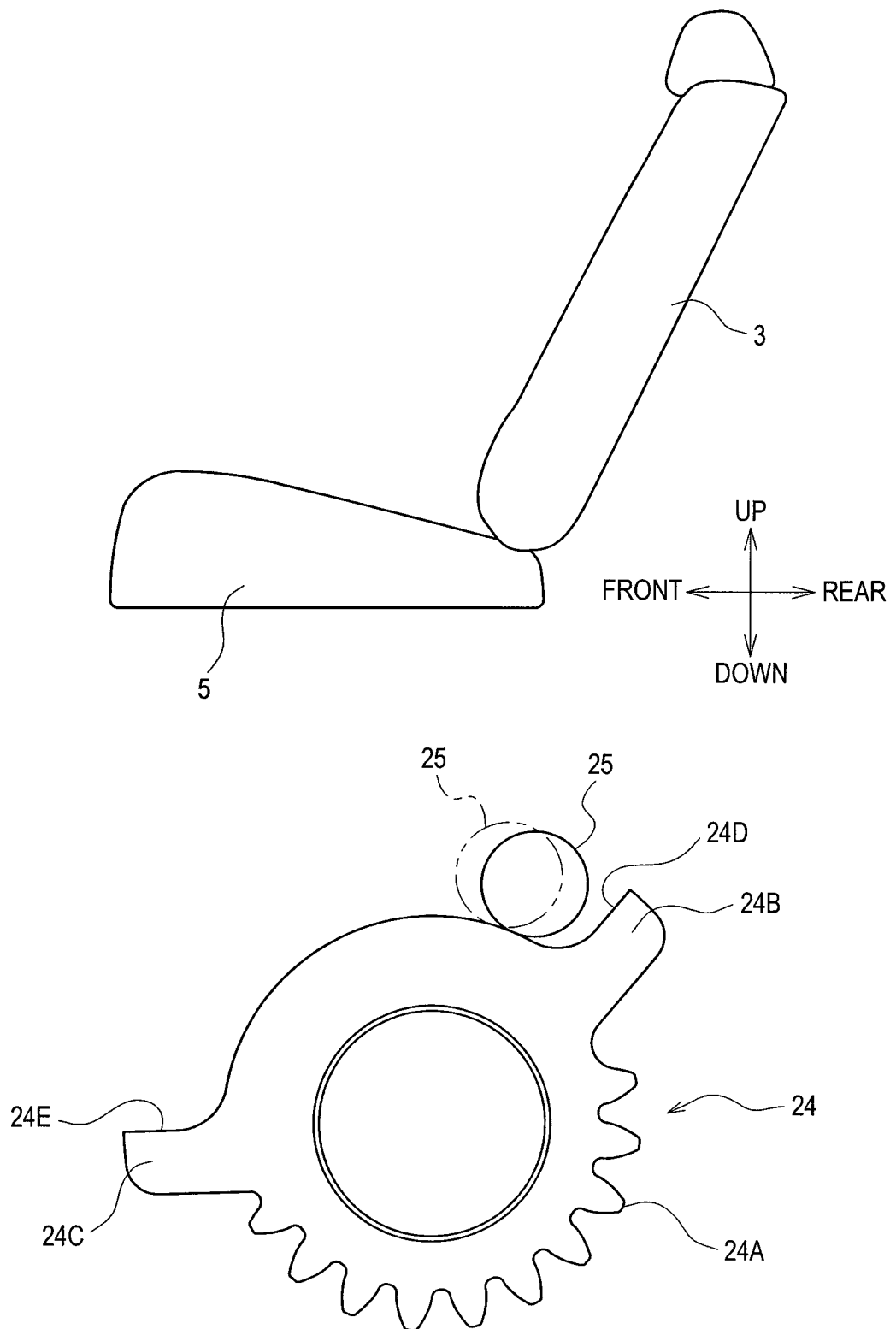
FIG. 16 is an explanatory diagram of the operation of the seatback rotating device of the first embodiment.

The press pin 25 shown in FIG. 16 by a solid line shows a position of the press pin 25 when the seatback 3 is placed in the second standing position. The press pin 25 shown in FIG. 16 by a double-dashed line shows a position of the press pin 25 when the seatback 3 is placed in the first standing position.

<Tilt Control of Sector Gear (Electric Motor)>

The controller 26 executes the following tilt control mode in displacing the seatback 3 to the tilt position when the seatback 3 is placed in the first standing position or the second standing position. The tilt control mode is executed when the user operates a tilting operation switch (not shown).

First of all, the controller 26 places the hook 11 of the lock device 10 in the released position. Then, the controller 26 rotates the electric motor 21 in the forward direction, to thereby bring the first protrusion 24B and the press pin 25 into contact with each other to apply a forward direction rotational force to the seatback 3.

Figure 17:
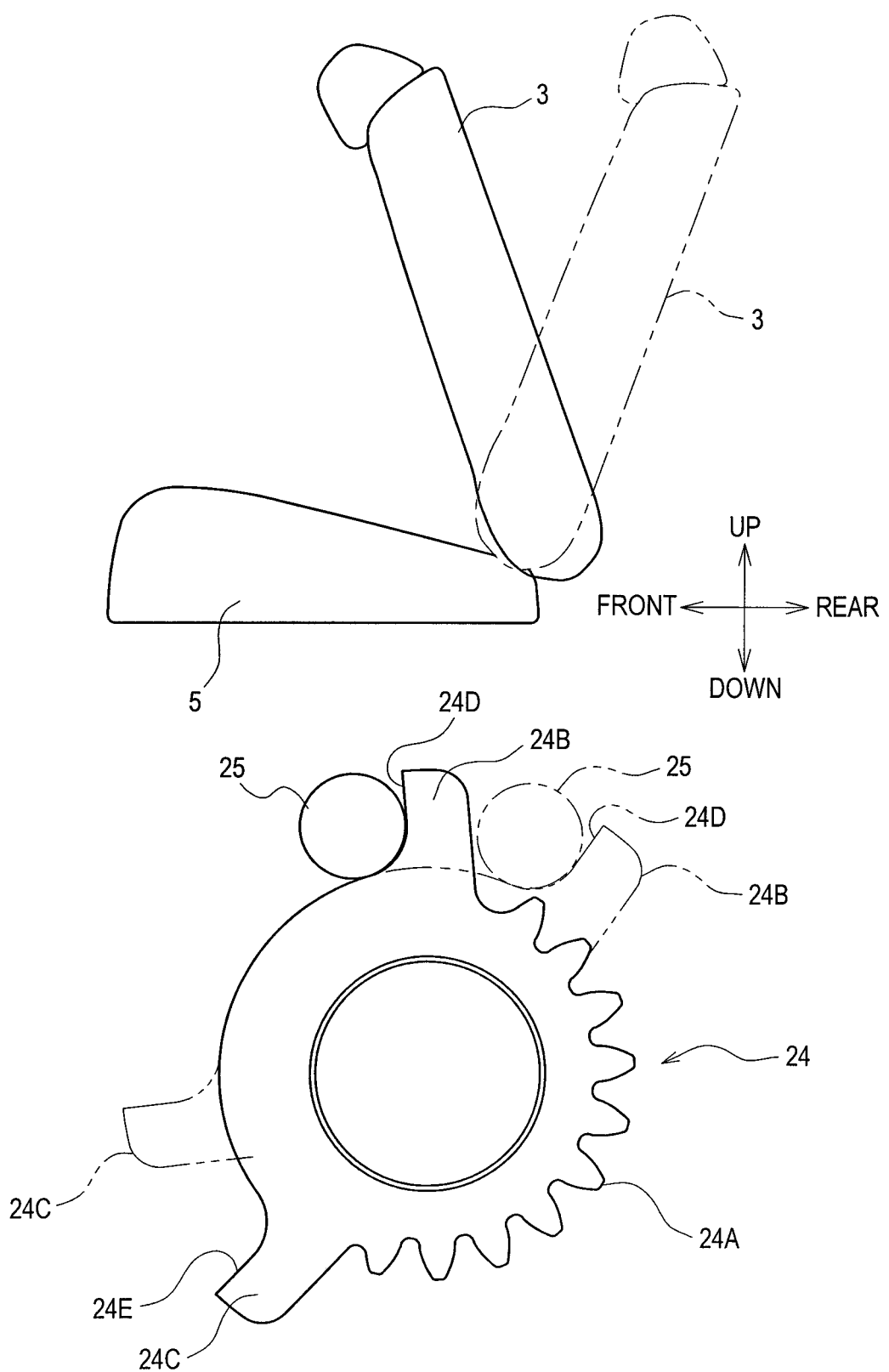
FIG. 17 is an explanatory diagram of the operation of the seatback rotating device of the first embodiment.

Then, the controller 26 rotates the electric motor 21 in the reverse direction to bring the first protrusion 24B back to a specified second position (see, FIG. 19) in response to the seatback 3 reaching the first position (FIG. 17). The second position of the present embodiment is a position of the first protrusion 24B when the sector gear 24 is placed in the standby state.

Figure 18:
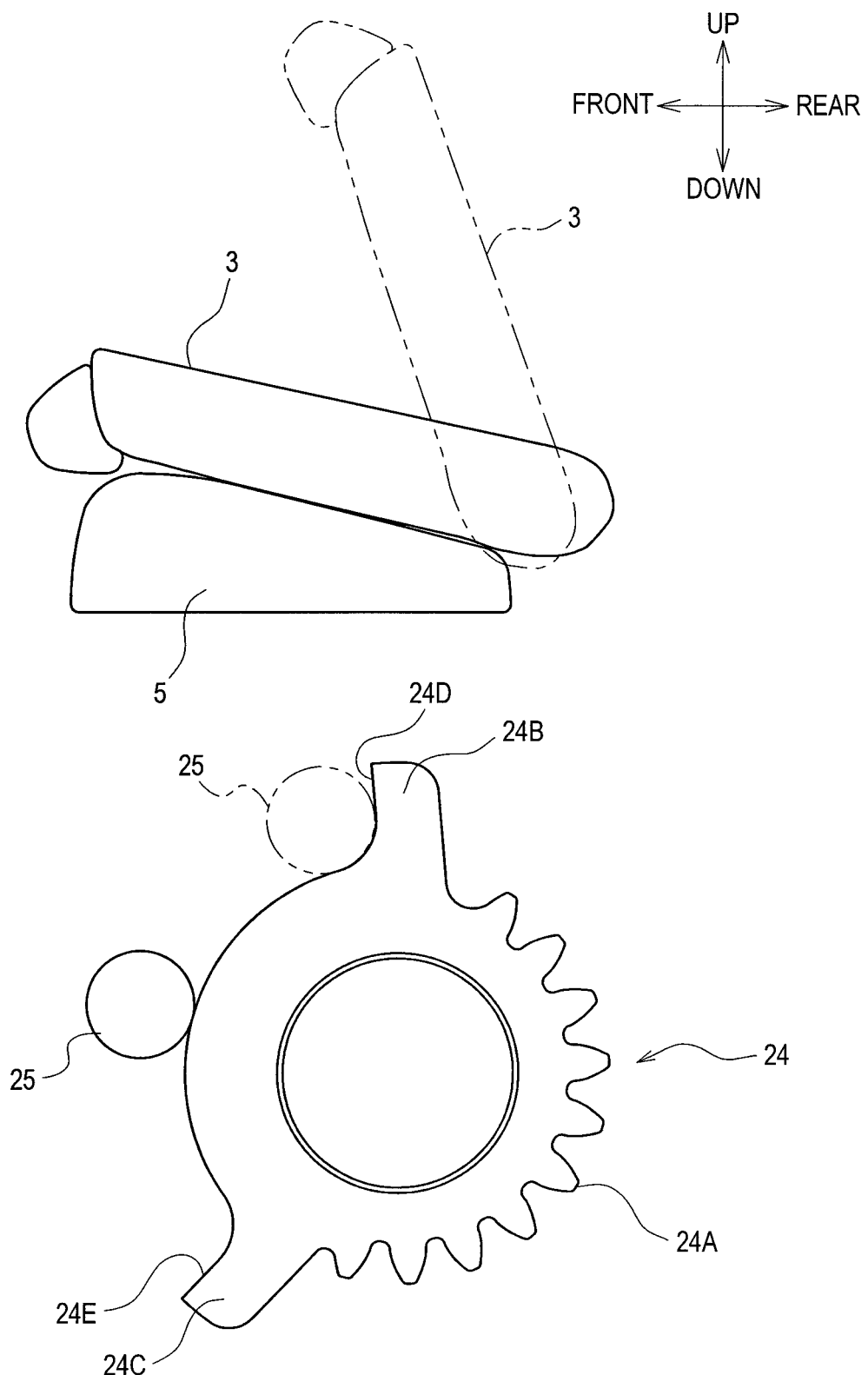
FIG. 18 is an explanatory diagram of the operation of the seatback rotating device of the first embodiment.

The seatback 3 rotates frontward such that the seatback 3 tilts due to the gravity derived from its own weight in response to the seatback 3 reaching the first position (FIG. 18). Accordingly, the second protrusion 24C is positioned within a range specified with respect to the press pin 25 when the seatback 3 is placed in a tilted state and the first protrusion 24B is placed in the second position (see, FIG. 19).

The above description "the second protrusion 24C is positioned in a range specified with respect to the press pin 25" means, for example, (a) a position where the second protrusion 24C and the press pin 25 contact each other or (b) a position where a distance L3 between the second protrusion 24C and the press pin 25 (see, FIG. 19) is equal to or less than a specified distance. The distance L3 is a distance along the rotational direction of the sector gear 24 about the central axis of the sector gear 24.

4. Operation of Seatback

In response to the controller 26 starting the tilt control mode in a state where the seatback 3 is placed in the first standing position (see, FIG. 15) or in the second standing position (see, FIG. 16), the hook 11 of the lock device 10 is placed in the released state and thereafter the electric motor 21 rotates in the forward direction.

In response to the electric motor 21 rotating in the forward direction and the seatback 3 reaching the first position (see, a solid line of FIG. 17), the electric motor 21 rotates in the reverse direction and the first protrusion 24B returns to the second position. Then, the electric motor 21 stops.

Figure 19:
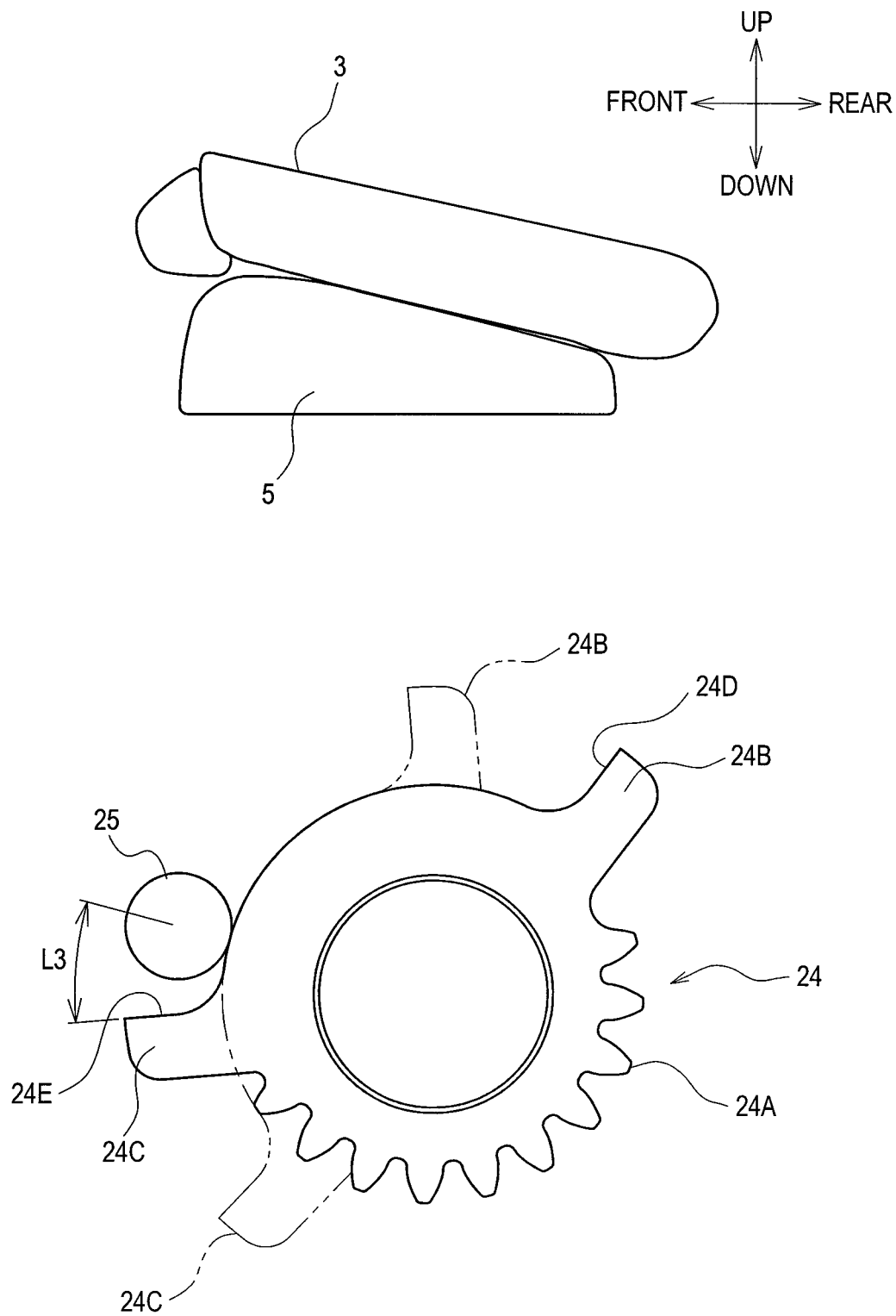
FIG. 19 is an explanatory diagram of the operation of the seatback rotating device of the first embodiment.
Figure 20:
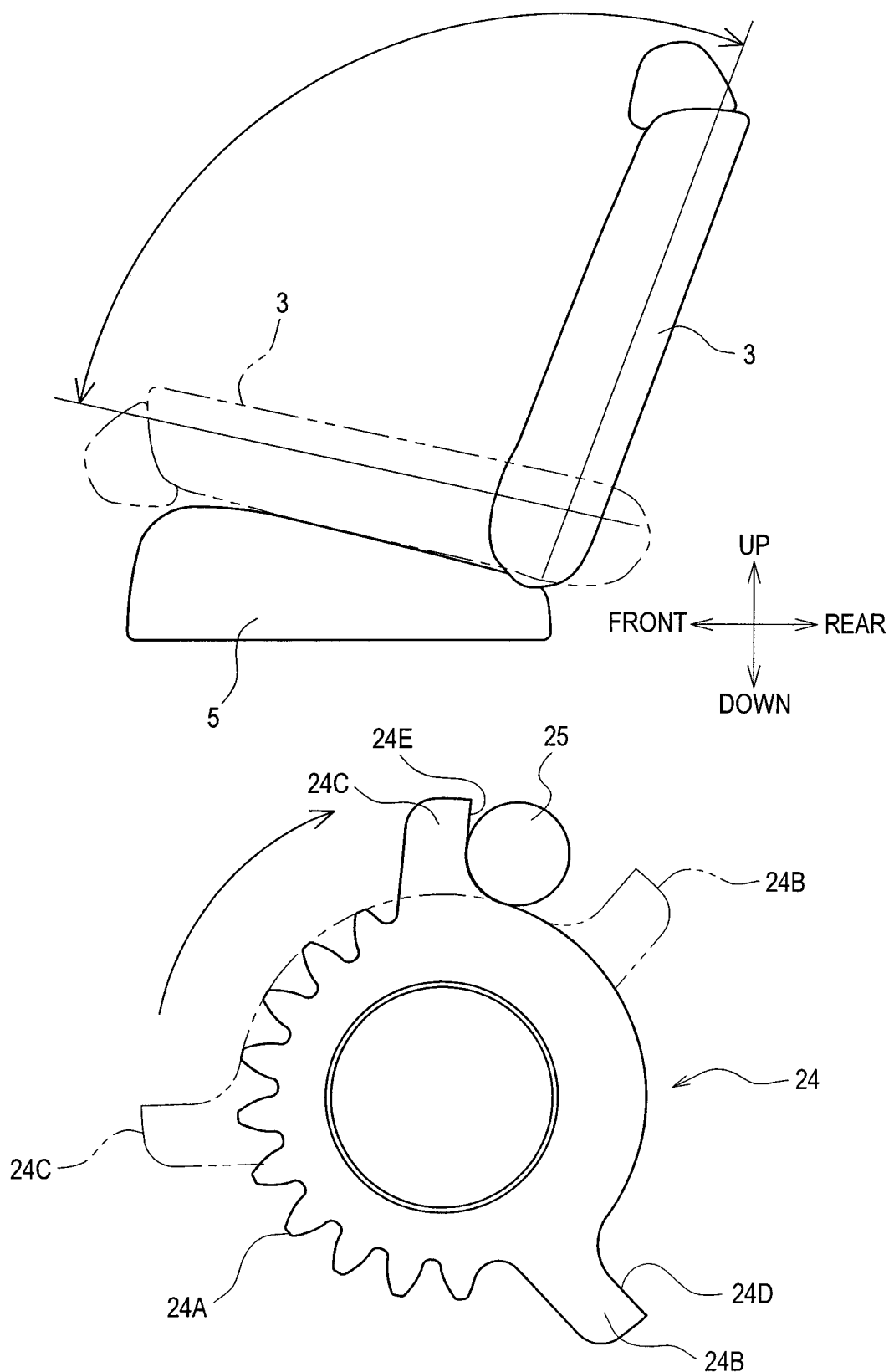
FIG. 20 is an explanatory diagram of the operation of the seatback rotating device of the first embodiment.

Here, the seatback 3 is already at the first position and is therefore rotationally displaced to the tilt position with its own weight (see, FIGS. 18 and 19). In response to the electric motor 21 rotating in the reverse direction in a state where the seatback 3 is placed in the tilted state (see, FIG. 19), the second protrusion 24C and the press pin 25 contact each other. In response to this, the seatback 3 rotates rearward in a standing manner.

Then, in response to the seatback 3 rotating to the first position, the seatback 3 is held in the first standing position by the lock device 10. In response to the seatback 3 being held in the first standing position, the controller 26 rotates the electric motor 21 in the reverse direction to bring the sector gear 24 back to the standby state (see, FIG. 15).

5. Features of Vehicle Seat of the Present Embodiment (Particularly, Seatback Rotating Device)

The application mechanism 23 of the seatback rotating device 20 is configured such that the seatback 3 is self-rotatable with the gravity applied to the seatback 3 in response to the rotational force of the electric motor 21 being applied to the seatback 3.

According to the aforementioned configuration, the seatback 3 starts rotating in response to the rotational force via the application mechanism 23 and then, the seatback 3 is placed in a self-rotatable state with the gravity applied to the seatback 3. During self-rotation, a rotation speed of the seatback 3 is small relative to a rotation speed according to a configuration in which the seatback 3 rotates via a spring.

Accordingly, the seatback rotating device 20 has a configuration that can inhibit the seatback 3 from tilting at an excessively large speed and, at the same time, can eliminate need of a spring that is used to tilt or rotationally displace the seatback 3.

The sector gear 24 is provided with the first protrusion 24B and the second protrusion 24C that are positioned with a space therebetween in the rotational direction of the sector gear 24. In the state where the first protrusion 24B and the press pin 25 contact each other, the second protrusion 24C is placed in the non-contact state with the press pin 25. And, the press pin 25 is always present between the first protrusion 24B and the second protrusion 24C without being affected by the position of the seatback 3.

According to the aforementioned configuration, in the seatback rotating device 20, one of the protrusions the first protrusion 24B or the second protrusion 24C contacts the press pin 25 and, in response to this, the seatback 3 starts rotating due to the rotational force.

The second protrusion 24C is situated at the position that is displaced with respect to the first protrusion 24B in the rotational direction of the sector gear 24. And, the press pin 25 is always present between the first protrusion 24B and the second protrusion 24C without being affected by the position of the seatback 3.

Thus, the aforementioned configuration enables the seatback 3 to be freely and rotationally displaceable in a section defined between the first protrusion 24B and the second protrusion 24C. Accordingly, the user of the vehicle seat 1 is allowed to rotationally displace the seatback 3 by manual operation. In other words, with the vehicle seat 1 of the present embodiment, it is possible to rotationally displace the seatback 3 by manual operation and, at the same time, it is possible to inhibit the rotation speed of the seatback 3 from excessively increasing.

The controller 26 rotates the electric motor 21 in the forward direction, to thereby bring the first protrusion 24B and the press pin 25 into contact with each other to apply the rotational force to the seatback 3. Thereafter, the controller 26 can execute the tilt control mode in which, in response to the seatback 3 reaching the first position, the electric motor 21 is rotated in the reverse direction to bring the first protrusion 24B back to the second position. According to this, the user can rotationally displace the seatback 3 by manual operation between the first position and the second position.

The second position is a position for placing the seatback 3 in the seatable state (the first standing position). Therefore, the user can place the seatback 3, which is tilted, in the seatable state by manual operation.

The second protrusion 24C is positioned in the range defined with respect to the press pin 25 when the seatback 3 is placed in the tilted state and the first protrusion 24B is placed in the second position. This allows the seatback 3 to immediately and rotationally start being displaced into the seatable state in conjunction with start of the rotation of the electric motor 21.

When the sector gear 24 is placed in the standby state, the gap length L1 along the rotational direction of the sector gear 24 from the first protrusion 24B to the press pin 25 is smaller than the gap length L2 along the rotational direction of the sector gear 24 from the second protrusion 24C to the press pin 25.

With the above configuration, in the seatback rotating device 20, one of the protrusions the first protrusion 24B or the second protrusion 24C contact the press pin 25 and, in response to this, the seatback 3 starts rotating due to the rotational force.

In the standby state, the gap length L1 along the rotational direction of the sector gear 24 allows the seatback 3 to be displaceable to the second standing position with the sector gear 24 being positioned in the standby state. Accordingly, the occupant can displace the seatback 3 to the second standing position when the sector gear 24 is placed in the standby state.

Second Embodiment

The sector gear 24 of the above-described embodiment is configured not to be able to rotate frontward beyond the first position. In contrast, the sector gear 24 of the present embodiment is rotatable until the seatback 3 is placed in the tilt position.

Hereinafter, descriptions are given to differences between the first embodiment and the second embodiment. The same constituent feature(s) as in the first embodiment is labelled with the same reference numeral in the first embodiment and therefore, overlapping descriptions are omitted in the second embodiment.

Figure 21:
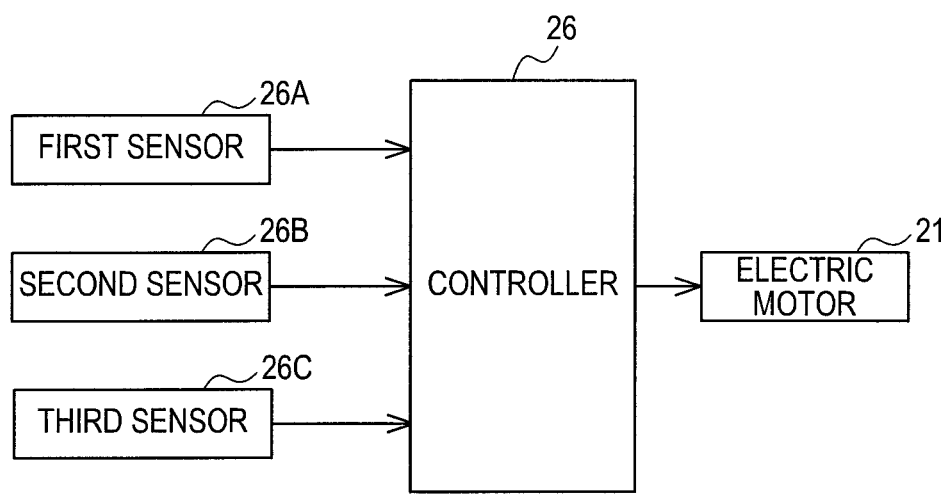
FIG. 21 is a block diagram of a control system of a seatback rotating device of a second embodiment.

Specifically, as with the second sensor 26B, the first sensor 26A of the second embodiment is configured with a limit switch or a proximity switch. As shown in FIG. 21, the controller 26 receives an output signal of a third sensor.

The third sensor 26C outputs a signal (hereinafter, referred to as a tilt signal) to the controller 26 in response to the seatback 3 reaching the tilt position, the tilt signal indicating that the seatback 3 reaches the tilt position. As with the first sensor 26A of the first embodiment, the third sensor 26C detects the tilt position taking advantage of increase in value of a conduction current flowing to the electric motor 21.

During execution of the tilt control mode, the controller 26 rotates the electric motor 21 in the forward direction until receiving the tilt signal. In other words, the seatback 3 starts rotating to the tilt position due to its own weight upon reaching the first position.

In a case where the controller 26 does not receive the tilt signal within a specified time after the seatback 3 reaches the first position, the controller 26 rotates the electric motor 21 in the forward direction until receiving the tilt signal. In response to receipt of the tilt signal, the controller 26 rotates the electric motor 21 in the reverse direction, to thereby bring the sector gear 24 back to the standby state (see, FIG. 15).

Other Embodiments

The second position of the above described embodiments is a position of the first protrusion 24B in which the sector gear 24 is placed in the standby state. However, the present disclosure is not limited hereto. The second position may be, for example, a position of the first protrusion 24B in which the sector gear 24 is placed in a state other than the standby state.

The position "specified first position" of the above-described embodiments is set between the tilt position and the first standing position. However, the present disclosure is not limited hereto. The position "specified first position" may be, for example, a position other than the position between the tilt position and the first standing position.

The second protrusion 24C of the above-described embodiments is configured to be positioned in the specified area defined with respect to the press pin 25 when the seatback 3 is placed in the tilt position and the first protrusion 24B is placed in the second position. However, the present disclosure is not limited hereto.

According to the above-described embodiments, the controller 26 rotates the electric motor 21 in the forward direction, to thereby bring the first protrusion 24B and the press pin 25 into contact with each other to apply the rotational force of the electric motor 21 to the seatback 3. Then, in response to the seatback 3 reaching the first position, the controller 26 rotates the electric motor 21 in the reverse direction to bring the first protrusion 24B back to the second position. However, the present disclosure is not limited hereto.

The above-described embodiments have a configuration in which, when the seatback 3 is placed in the first standing position, the sector gear 24 is in a position that creates a gap between the first protrusion 24B and the press pin 25 and a gap between the second protrusion 24C and the press pin 25. However, the present disclosure of this specification is not limited hereto.

The above-described embodiments have a configuration in which, in the standby state, the gap length L1 along the rotational direction of the sector gear 24 is small relative to the gap length L2 along the rotational direction of the sector gear 24. However, the present disclosure is not limited hereto.

Specifically, the present disclosure may be configured, for example, such that the gap length L1 along the rotational direction of the sector gear 24 and the gap length L2 along the rotational direction of the sector gear 24 are the same in the standby state, or may be configured such that the gap length L1 along the rotational direction of the sector gear 24 is greater than the gap length L2 along the rotational direction of the sector gear 24 in the standby state.

According to the above-described embodiments, in the standby state, the gap length L1 along the rotational direction of the sector gear 24 allows the seatback 3 to be displaced to the second standing position with the sector gear 24 being positioned in the standby state. However, the present disclosure is not limited hereto.

The above-described embodiments described examples of a vehicle seat for a vehicle. Nevertheless, the present disclosure should not be limited to these examples and may be applied to seats used in other vehicles, such as railroad vehicles, ships and boats, and aircrafts, as well as built-in seats used in theaters, households, and the like.

Furthermore, the present disclosure should not be limited to the above-described embodiments as long as it falls within the spirit of the invention disclosed in the disclosure described in the above-described embodiments. Accordingly, the present disclosure may be configured in combination of at least two of the above-described embodiments or may be the above-described embodiments configured without either the configuration requirements described in the drawings or the elements described with reference numerals.

What is claimed is:

1. A seatback rotating device comprising:
   an electric motor generating a rotational force that is used to rotationally displace a seatback of a vehicle seat;
   a rotor rotating in response to the rotational force by the electric motor, the rotor including a first protrusion and a second protrusion that protrude in a radial direction of the rotor;
   a pin integrally and rotationally displaced with the seatback; and
   a processor that controls an operation of the electric motor,
   wherein the first protrusion and the second protrusion are spaced from each other,
   wherein the pin is disposed to move toward a specified first position by the rotational force of the electric motor applied to the pin by a contact of the first protrusion and the pin, in response to a rotation of the electric motor in a forward direction,
   wherein the pin enables one of the first protrusion or the second protrusion to contact the pin and is configured to experience the rotational force in response to a contact with one of the first protrusion or the second protrusion,
   wherein the second protrusion is disposed in a position that is displaced with respect to the first protrusion in a rotational direction of the rotor, the position of the second protrusion placing the second protrusion in a non-contact state with the pin in a state where the first protrusion and the pin contact each other,
   wherein the pin is always present between the first protrusion and the second protrusion without being affected by a position of the seatback, and
   wherein the processor enables execution of a control mode in which the electric motor is rotated in the forward direction to bring the first protrusion and the pin into contact with each other to apply the rotational force to the seatback, and, in response to the seatback reaching the specified first position by rotating the electric motor in the forward direction, the electric motor is rotated in a reverse direction to bring the first protrusion back to a specified second position.

2. The seatback rotating device according to claim 1, wherein the second protrusion is situated in a specified area defined with respect to the pin when the seatback is placed in a tilted state and the first protrusion is placed in the specified second position.

3. The seatback rotating device according to claim 1, further comprising:
   a sensor that detects that the seatback reaches a tilt position,
   wherein the processor rotates the electric motor in the forward direction until the sensor detects that the seatback reaches the tilt position.

4. The seatback rotating device according to claim 2, further comprising:
   a sensor that detects that the seatback reaches a tilt position, and
   wherein the processor rotates the electric motor in the forward direction until the sensor detects that the seatback reaches the tilt position.

5. The seatback rotating device according to claim 1, wherein the first protrusion is spaced from the second protrusion in a seat-rearward direction.

* * * * *